(12) United States Patent
Kim et al.

(10) Patent No.: US 9,429,786 B2
(45) Date of Patent: Aug. 30, 2016

(54) DISPLAY APPARATUS INCLUDING TEMPERATURE COMPENSATION UNIT, DISPLAY MODULE APPLIED THEREIN, AND METHOD FOR CONTROLLING TEMPERATURE OF DISPLAY MODULE

(75) Inventors: Jin-sub Kim, Seoul (KR); Kwang-youn Kim, Suwon-si (KR); Jin-hyun Cho, Seoul (KR); Hoon Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1179 days.

(21) Appl. No.: 13/087,052

(22) Filed: Apr. 14, 2011

(65) Prior Publication Data

US 2011/0255047 A1 Oct. 20, 2011

(30) Foreign Application Priority Data

Apr. 16, 2010 (KR) .................. 10-2010-0035535
Feb. 24, 2011 (KR) .................. 10-2011-0016471

(51) Int. Cl.
*G02F 1/1333* (2006.01)
*G02F 1/1335* (2006.01)

(52) U.S. Cl.
CPC ... *G02F 1/133382* (2013.01); *G02F 1/133615* (2013.01); *G02F 2001/133628* (2013.01)

(58) Field of Classification Search
CPC ........... G02F 1/13382; G02F 1/13385; G02F 1/133615; G02F 1/13314; G02F 2001/133628
USPC ....................... 349/58, 61, 65, 161
See application file for complete search history.

(56) References Cited

U.S. PATENT DOCUMENTS

| | | | |
|---|---|---|---|
| 4,643,525 A * | 2/1987 | Haim | 349/161 |
| 5,299,038 A * | 3/1994 | Hamada et al. | 349/161 |
| 5,744,819 A * | 4/1998 | Yamamoto et al. | 257/59 |
| 6,072,459 A | 6/2000 | Asakawa et al. | |
| 6,163,359 A * | 12/2000 | Smith et al. | 349/161 |
| 2006/0285360 A1* | 12/2006 | Hasei | 362/627 |
| 2007/0035223 A1* | 2/2007 | Yoo et al. | 313/27 |
| 2008/0043490 A1* | 2/2008 | Coleman et al. | 362/623 |
| 2009/0161036 A1 | 6/2009 | Cho et al. | |
| 2010/0014025 A1* | 1/2010 | Teragawa | 349/64 |

FOREIGN PATENT DOCUMENTS

CN 101421857 A 4/2009
JP 7-333586 * 12/1995
(Continued)

OTHER PUBLICATIONS

Computer translation of JP 7-333586, Dec. 1995, pp. 1-7.*
(Continued)

*Primary Examiner* — Hoan C Nguyen
(74) *Attorney, Agent, or Firm* — Sughrue Mion, PLLC

(57) ABSTRACT

A display module including a liquid crystal panel that displays an input image, a backlight unit that produces light, at least one optical sheet that emits the light produced by the backlight unit toward a rear side of the liquid crystal panel and a temperature compensation unit having a heating sheet that transfers heat to a region of the liquid crystal panel are provided. The heating sheet has a heating wire disposed in a first region of the heating sheet and excluding a second region of the heating sheet superimposed over at least one of a liquid crystal driving board, a processing board, and a power supply unit.

18 Claims, 14 Drawing Sheets

(56) References Cited

FOREIGN PATENT DOCUMENTS

| JP | 2008-111871 A | 5/2008 |
|---|---|---|
| KR | 10-2006-0087951 A | 8/2006 |
| KR | 10-2007-0068792 A | 7/2007 |
| WO | 2007/136020 A1 | 11/2007 |

OTHER PUBLICATIONS

Communication from the European Patent Office issued Dec. 7, 2012 in counterpart European Application No. 11162689.1.

Communication dated May 15, 2014 issued by the Chinese Patent Office for Chinese Patent Application No. 201110096662.X.

Communication dated Nov. 24, 2014 issued by the State Intellectual Property Office of the People's Republic of China in counterpart Chinese Patent Application No. 201110096662.X.

Communication dated Jan. 19, 2016 issued by the European Patent Office in counterpart European Patent Application No. 11162689.1.

* cited by examiner

US 9,429,786 B2

DISPLAY APPARATUS INCLUDING TEMPERATURE COMPENSATION UNIT, DISPLAY MODULE APPLIED THEREIN, AND METHOD FOR CONTROLLING TEMPERATURE OF DISPLAY MODULE

CROSS-REFERENCE TO RELATED APPLICATIONS

This application claims priority from Korean Patent Applications No. 10-2010-0035535 filed Apr. 16, 2010 and No. 10-2011-0016471 filed Feb. 24, 2011, in the Korean Intellectual Property Office, the disclosures of which are incorporated herein by reference in their entirety.

BACKGROUND

1. Field

Apparatuses and methods consistent with the present disclosure relate to a display apparatus, a display module applied therein, and a method for controlling a temperature of the display module. More specifically, the present disclosure relates to a display apparatus providing an edge-type backlight, a display module applied therein, and a method for controlling a temperature of the display module.

2. Description of the Related Art

Recently, the thickness of display apparatuses has become smaller. As Light Emitting Diode (LED) technology advances, applications of the LED are expanding. Particularly, as the LED is used as a backlight of the display apparatus, the thickness of the display apparatus can be reduced.

To reduce the thickness of the display apparatus using the LED, an edge-type backlight is used, which places the LED backlight at the edge of the display.

However, when an edge-type backlight is adopted, the temperature of the display increases near the edges of the screen and decreases near the center of the screen. As such, when the temperature of the display is low, a response speed of the display is reduced and thus it is hard to provide high-quality images. In particular, when a three dimensional (3D) image is represented, the frequency for outputting the image to the screen rises and a higher response speed is required.

The 3D image includes a left-eye image and a right-eye image, which are displayed alternately. When the response speed of the display is low, crosstalk can occur causing the left-eye image and the right-eye image to overlap. Thus, a high response speed is desired to represent the 3D image in order to reduce crosstalk.

In addition, the temperature difference between the center of the screen and the edge of the screen created by using an edge-type backlight may cause other negative effects. For example, the displayed input image may be distorted, and the display module may become twisted.

In addition, the temperature in the area close to a heating element (for example, a power supply board) which itself produces heat can be higher than the temperature of the area away from the heating element in the display module. This temperature difference may also distort the input image and bend or twist the display module.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a display apparatus including a temperature compensation unit for compensating for a temperature of a liquid crystal panel, and a display panel applied therein.

The present disclosure provides a method for controlling a temperature of a display module by controlling power supplied to a heating sheet according to the temperature detected at the display module.

According to an aspect of an exemplary embodiment, a display apparatus includes a display module that displays an input image. The display module includes a liquid crystal panel that displays an input image; a plurality of optical sheets that emit the light produced from the backlight unit to the liquid crystal panel; a backlight unit disposed on a side of the liquid crystal panel, for producing light; a heating sheet for generating heat to the liquid crystal panel; and a rear cover for accommodating the components of the display module.

The heating sheet may be disposed in a region between the liquid crystal panel and the rear cover.

The heating sheet can be of a sheet type including a heating wire therein.

The optical sheet may include a light guide plate. The backlight unit may include a plurality of Light Emitting Diodes (LEDs) disposed in a side of the light guide plate.

The optical sheet may be disposed in a region between the liquid crystal panel and the rear cover.

The display module may further include at least one of a Timing Controller (TCON) board, a power supply unit, and a main processing board, which are secured to the rear cover. The heating sheet may be disposed to heat a region excluding at least one of the TCON board, the power supply unit, and the main processing board.

The display module may further include a TCON board, and the heating sheet may be disposed to heat a region excluding the liquid crystal driving board.

The display apparatus may further include a main control apparatus which is provided separately outside the display apparatus and connected to the display apparatus for controlling the display apparatus.

The display apparatus may further include a temperature sensor unit for detecting the temperature of the display module. The heating sheet may regulate the heating level according to the temperature detected by the temperature sensor unit.

The temperature sensor unit may be disposed in a center part of the display module.

The display apparatus may further include a power supply unit for supplying power to the heating sheet. The heating sheet may include a connector connected to the power supply unit, of which one end is connected to a power supply terminal of the power supply unit and the other end is connected to and earthed by the rear cover.

The display apparatus may further include a power supply unit for supplying power to the heating sheet. The heating sheet may include a connector connected to the power supply unit, of which one end is connected to a power supply terminal of the power supply unit, and the other end is connected to and earthed by a ground terminal of the power supply unit.

The display apparatus may be a 3D TV.

According to another aspect of an exemplary embodiment, a display module includes a liquid crystal panel that displays an input image in a front side; a backlight unit disposed on a side below the liquid crystal panel, that produces light; at least one optical sheet that emits the light produced from the backlight unit toward a rear side of the liquid crystal panel; a rear cover for accommodating the liquid crystal panel, the at least one optical sheet, and the backlight unit; and a temperature compensation unit disposed behind the liquid crystal panel, that compensates for a temperature of the liquid crystal panel.

The temperature compensation unit may include a heating sheet which produces heat transferred to the liquid crystal panel by receiving an electrical signal, and the heating sheet may be disposed in a region between the liquid crystal panel and the rear cover.

The at least one optical sheet may include a light guide plate. The backlight unit may include a plurality of LEDs disposed on a side of the light guide plate.

The heating sheet may be disposed in a center part of the rear cover.

The temperature compensation unit may be a heat conductive sheet which is attached to a side of the rear cover for diffusing the heat generated from a heating element across a surface.

The heating element may be one of a liquid crystal driving board for driving the liquid crystal panel, a main processing board for converting and processing the input image to display in the liquid crystal panel, and a power supply board for supplying power to electrical elements comprising the liquid crystal panel, the backlight unit, the liquid crystal driving board, and the main processing board.

According to yet another aspect of an exemplary embodiment, a display apparatus includes a display module which includes a front cover, a liquid crystal panel that displays an input image in a front side, a backlight unit disposed in a side below the liquid crystal panel, that produces light, at least one optical sheet that emits the light produced from the backlight toward a rear side of the liquid crystal panel, a rear cover coupled to the front cover and which accommodates the liquid crystal panel, the at least one optical sheet, and the backlight unit, and a temperature compensation unit disposed behind the liquid crystal panel, for reducing the difference in temperature distribution of the liquid crystal panel; a liquid crystal driving board for driving the liquid crystal panel; a main processing board for converting and processing the input image to display in the liquid crystal panel; and a power supply board for supplying power to electrical elements comprising the liquid crystal panel, the backlight unit, the liquid crystal driving board, and the main processing board.

The temperature compensation unit may include a heating sheet which produces heat transferred to the liquid crystal panel by receiving an electrical signal from the power supply board.

The heating sheet may be disposed in a center part of the rear cover.

At least one of the liquid crystal driving board, the main processing board, and the power supply board may be disposed on a rear side of the rear cover, and the heating sheet may be disposed to transfer heat to a region of the liquid crystal panel corresponding to a region excluding at least one of the liquid crystal driving board, the main processing board, and the power supply board.

The display apparatus may further include a main control apparatus mechanically separated from the rear cover. The main control apparatus may accommodate at least one of the liquid crystal driving board, the main processing board, and the power supply board.

The display apparatus may further include a temperature sensor unit for detecting the temperature of the display module; a power supply unit for supplying the power to the heating sheet; and a power control unit for regulating the power of the power supply unit according to the temperature information detected by the temperature sensor unit.

At least one temperature sensor unit may be disposed in the center part inside the rear cover.

The display apparatus may further include a power supply unit for supplying the power to the heating sheet, and the heating sheet may include a connector for connecting to the power supply unit.

One end of the connector may be connected to a power supply terminal of the power supply unit, and the other end of the connector may be connected to and grounded by the rear cover.

One end of the connector may be connected to a power supply terminal of the power supply unit, and the other end of the connector may be connected to and grounded by a ground terminal of the power supply unit.

The temperature compensation unit may be a heat conductive sheet which is attached to a side of the rear cover and diffuses the heat generating from the heating element on a surface.

The heating element may be at least one of the liquid crystal driving board, the main processing board, and the power supply board.

The heat conductive sheet may be attached to an outer side of the rear cover. An insulating material may be interposed between the heating element and the heat conductive sheet, the insulating material having a smaller cross section than the heating element and blocking the heat generated from the heating element from transferring to the heat conductive sheet, and only some of the heat generated from the heating element may be diffused to the liquid crystal panel through the rear cover via the heat conductive sheet using the insulating material.

A heat conductor having a smaller cross section than the heating element and transferring the heat generated from the heating element to the heat conductive sheet may be disposed side by side with the insulating material.

According to still another aspect of an exemplary embodiment, a method for controlling a temperature of a display module in a display apparatus which includes the display module including a heating unit, includes detecting the temperature of the display module; and controlling power supplied to the heating unit to partially heat a liquid crystal panel according to the detected temperature.

The controlling operation may control the power supplied to a heating sheet to maintain the temperature of the display module in a particular temperature range by gradually decreasing the power with time.

BRIEF DESCRIPTION OF THE DRAWINGS

The above and/or other aspects of the present disclosure will become more apparent by describing certain exemplary embodiments of the present disclosure with reference to the accompanying drawings, in which.

DETAILED DESCRIPTION OF EXEMPLARY EMBODIMENTS

Figure 1A:
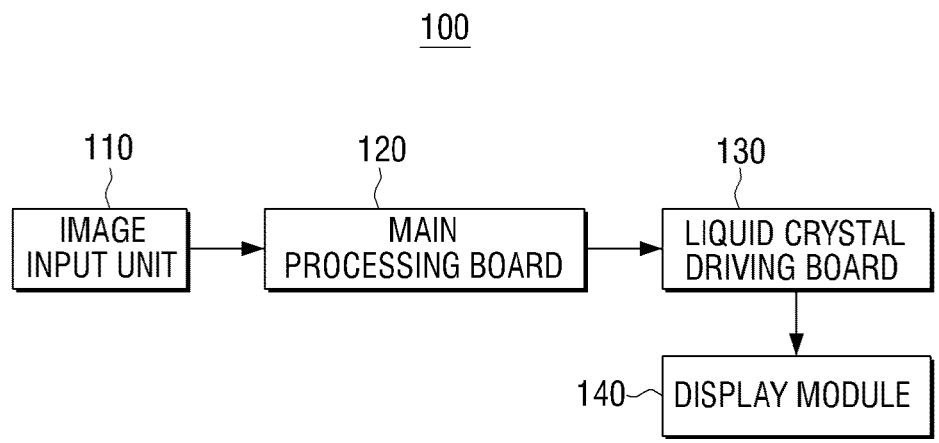
FIGS. 1A and 1B are diagrams of a display apparatus according to an exemplary embodiment.

Exemplary embodiments of the present disclosure are described in greater detail below with reference to the accompanying drawings.

In the following description, like drawing reference numerals are used for the like elements, even in different drawings. The matters defined in the description, such as detailed construction and elements, are provided to assist in a comprehensive understanding of the invention. However, the present disclosure can be practiced without those specifically defined matters. Also, well-known functions or constructions are not described in detail since they would obscure the invention with unnecessary detail.

Figure 1B:
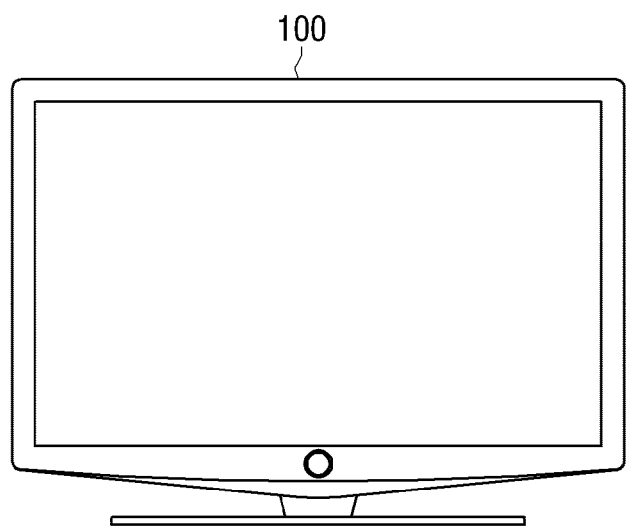

FIGS. 1A and 1B depict a display apparatus according to an exemplary embodiment. As shown in FIG. 1A, the display apparatus 100 includes an image input unit 110, a main processing board 120, a liquid crystal driving board 130, and a display module 140.

The image input unit 110 receives an image signal from an external source. In more detail, the image input unit 110 can be a tuner for receiving broadcast signals, and an A/V interface for receiving cable broadcasts, analog image signals, or digital image signals.

The main processing board 120 controls operations of the display apparatus 100. The main processing board 120 processes the image input through the image input unit 110, and outputs the processed image to the liquid crystal driving board 130.

The liquid crystal driving board 130 controls a display timing of the display module 140 according to the input image signal. In detail, the liquid crystal driving board 130 generates a driving signal of the display module 140 based on the input image signal, and provides the driving signal to the display module 140 at the proper timing.

In particular, the liquid crystal driving board 130 is called a Timing controller (TCON) board. A connector linked to a power supply unit, connectors linked to a liquid crystal panel of the display module 140, and a timing controller integrated circuit (IC) for driving the liquid crystal panel are mounted on the liquid crystal driving board 130.

The display module 140 displays the input image signal under control of the liquid crystal driving board 130. The display module 140 includes the liquid crystal panel and various optical sheets. The display module 140 includes an edge-type backlight. Herein, the edge-type backlight emits light from the side of the display and thus provides the backlight. The display module 140 will be described further with reference to FIG. 2. The display module 140 can employ a Liquid Crystal Display (LCD) module.

FIG. 1B depicts the exterior of the display apparatus 100 of FIG. 1A. The display apparatus 100 of FIG. 1A does not require a separate external device as shown in FIG. 1B.

Figure 1C:
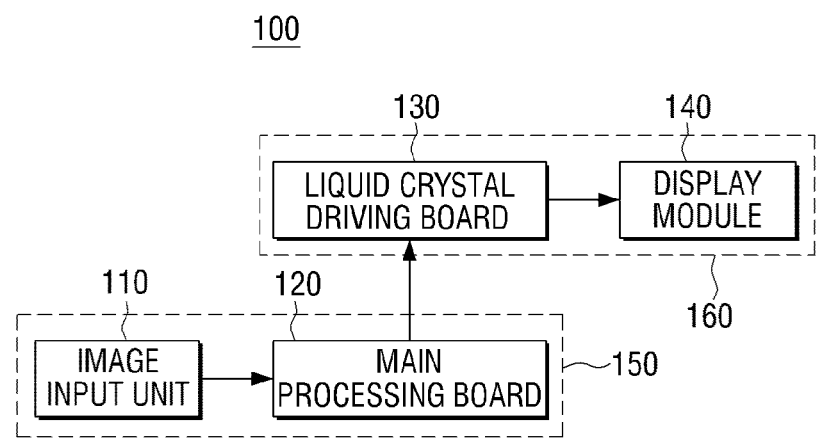
FIGS. 1C and 1D are diagrams of a display apparatus including an external main control apparatus according to an exemplary embodiment.
Figure 1D:
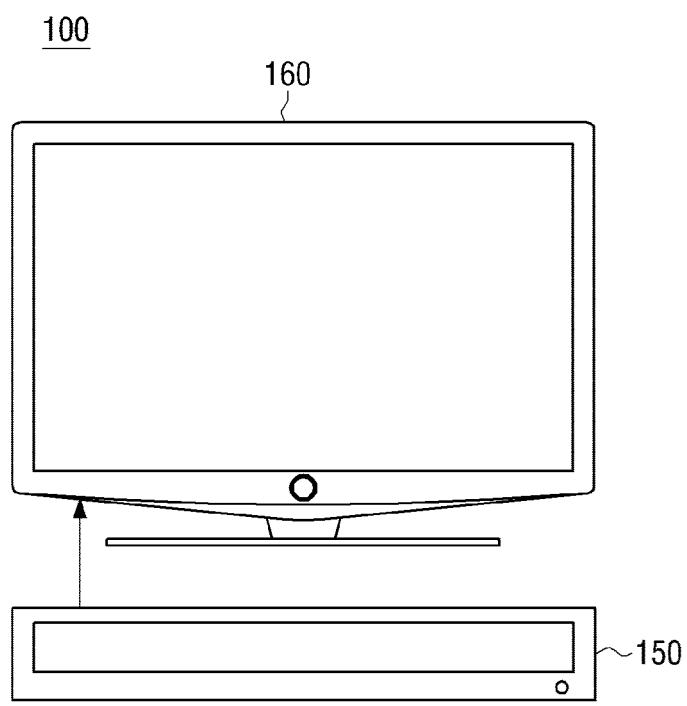

FIGS. 1C and 1D illustrate a display apparatus including an external main control apparatus 150 according to an exemplary embodiment. The display apparatus 100 of FIG. 1C is similar to that of FIG. 1A, whereas the image input unit 110 and the main processing board 120 belong to the external main control apparatus 150. The display unit 160 includes the liquid crystal driving board 130 and the display module 140. The main control apparatus 150 and the display unit 160 are connected by a cable, or wirelessly communicate with each other.

As such, when the image input unit 110 and the main processing board 120 belong to the external main control apparatus 150, the display components of the display unit 160 are reduced to thus decrease the thickness of the display unit 160. Accordingly, a thinner display apparatus 100 can be implemented. In addition to the image input unit 110 and the main processing board 120, the external main control apparatus 150 can further include a power supply board (not shown).

FIG. 1D depicts the exterior of the display apparatus 100 of FIG. 1C. The display apparatus 100 of FIG. 1C separates the external main control apparatus 150 and the display unit 160 as shown in FIG. 1D. Hence, the display unit 160 can achieve a smaller thickness.

To further reduce the thickness of the display apparatus 100, an edge-type backlight and the external main control apparatus 150 can be employed. In this case, the component for emitting the heat inside the display apparatus 100 can be reduced. Thus, the temperature inside the display apparatus 100 is lowered, which causes crosstalk.

Herein, crosstalk overlaps images because of the low response speed of the display. Especially, when a 3D image is displayed, a problem occurs when the left-eye image and the right-eye image are overlapped. As the temperature is low, the response speed of the display is reduced. Hence, the lower temperature aggravates the crosstalk of the display.

When the edge-type backlight is provided, the temperature of the center region of the display module 140 is lower than the temperature of the edges. As a result, the display module 140 is subject to thermal deformation such as warpage or distortion. In addition, the heating element (for example, the power supply board, the liquid crystal driving board, the main processing board, etc.) of the display module 140 causes its ambient temperature to increase relative to the surrounding areas, which also causes thermal deformation such as warpage or distortion.

Figure 2:
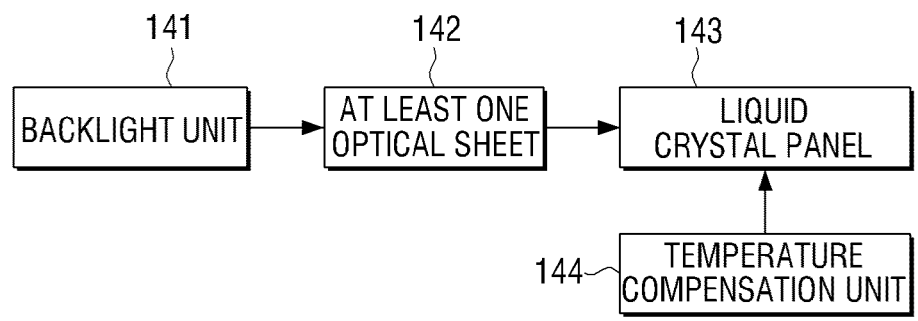
FIG. 2 is a block diagram of a display module according to an exemplary embodiment.

Thus, to increase the temperature and to diminish the temperature difference of the display module 140, the display module 140 of the display apparatus 100 includes a temperature compensation unit 144, which shall be described in detail by referring to FIG. 2. FIG. 2 is a block diagram of the display module 140 according to an exemplary embodiment.

As shown in FIG. 2, the display module 140 includes a backlight unit 141, at least one optical sheet 142, a liquid display panel 143, and the temperature compensation unit 144.

The backlight unit 141 produces the backlight to the liquid crystal panel 143 through the at least one optical sheet 142. The backlight unit 141 can be an edge-type backlight unit disposed on two sides facing each other in a light guide plate. A light source of the edge-type backlight employs a point light source, more specifically, a LED light source. Yet, note that the backlight unit 141 does not limit the type of the light source.

The at least one optical sheet 142 emits the light produced by the backlight unit 141 to the liquid display panel 143. The at least one optical sheet 142 includes at least one of a prism sheet, a diffuser sheet, a light guide plate, and a reflection sheet. The prism sheet, the diffuser sheet, the light guide plate, and the reflection sheet will be described with reference to FIG. 3.

The liquid crystal panel 143 visualizes and displays the image signal in the screen by regulating light transmittance in the backlight unit 141. More specifically, the liquid crystal panel 143 includes two substrates with electrodes facing each other, and a liquid crystal material is injected between the two substrates. Herein, when voltage is applied to the two substrates, an electric field is generated to move molecules of the liquid crystal material injected between the two substrates. Thus, the liquid crystal panel 143 regulates the light transmittance. The liquid crystal panel 143 can control the light transmittance base on the input image signal and thus displays the image.

The temperature compensation unit 144 compensates for the temperature of the liquid crystal panel 143 by providing heat to the liquid crystal panel 143. In detail, the temperature compensation unit 144 can be implemented using a heating sheet which rapidly increases the temperature of the liquid crystal panel 143 by receiving an electric signal and generating the heat transferred to the liquid crystal panel 143.

The heating sheet can reduce the temperature difference between different regions of the display module by partially heating a particular region of the display module. The heating sheet can reduce the temperature difference by raising the temperature in the center of the display module 140 or in the region away from the heating element, where the temperature is low in the display module 140.

The temperature compensation unit 144 can be implemented using a heat conductive sheet which diffuses the heat produced by the heating element (for example, the backlight unit and the power supply board) of the display module 140 across the surface.

Figure 10:
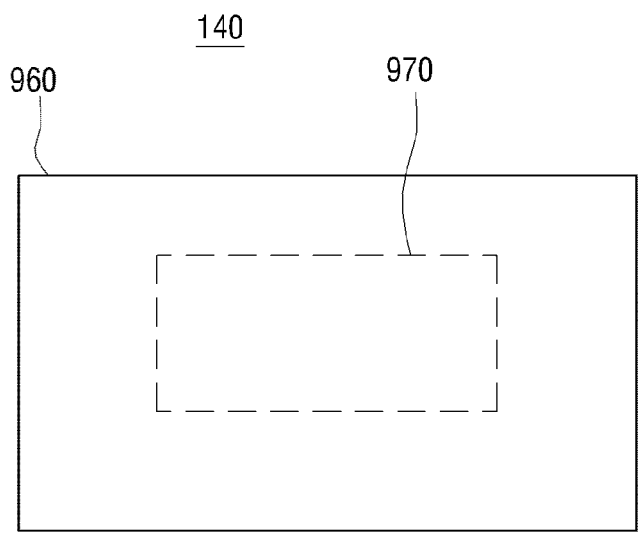
FIG. 10 is a rear view of the display module including the heating sheet according to another exemplary embodiment.
Figure 11:
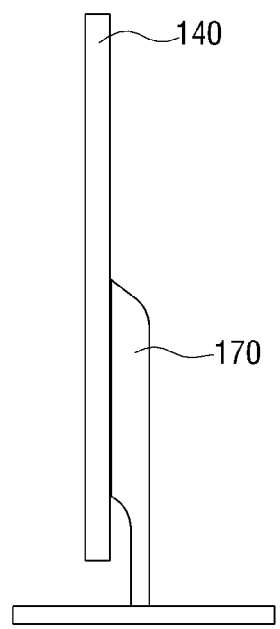
FIG. 11 is a side view of the display apparatus including the heating sheet according to another exemplary embodiment.
Figure 12:
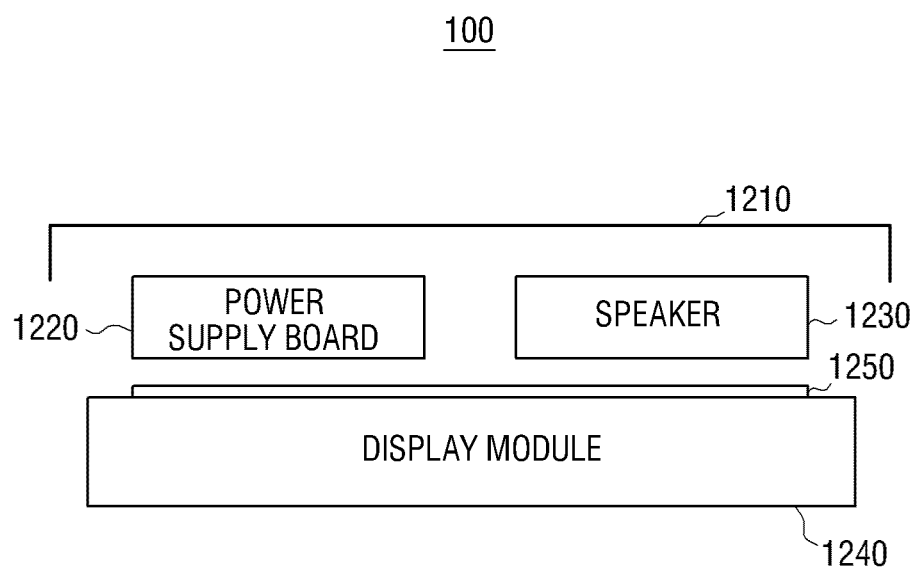
FIG. 12 is a diagram of the display module including a heat conductive sheet according to an exemplary embodiment.
Figure 13:
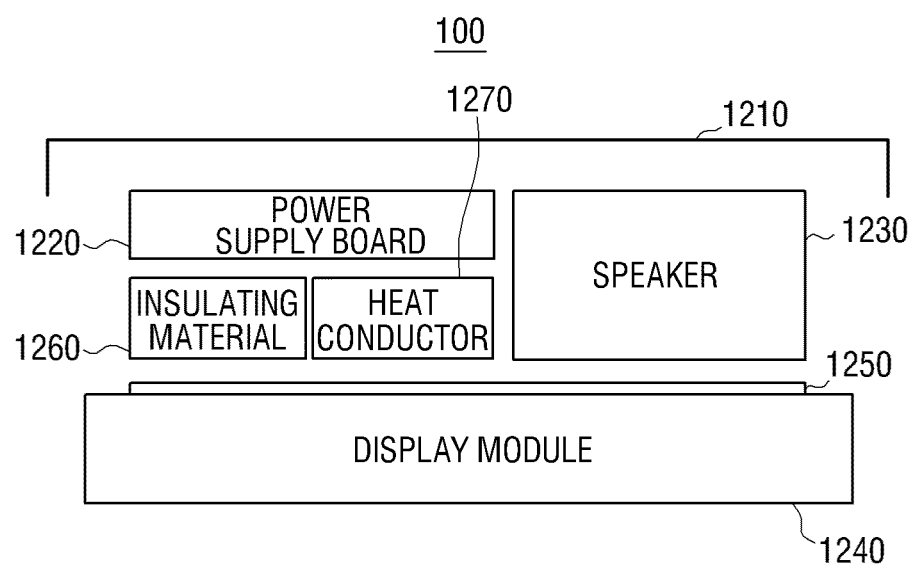
FIG. 13 is a diagram of another display module including a heat conductive sheet according to an exemplary embodiment.

The temperature compensation unit 144, which includes the heating sheet, is explained by referring to FIGS. 3 through 11, and the temperature compensation unit 144, which includes the heat conductive sheet, is explained by referring to FIGS. 12 and 13.

Figure 3:
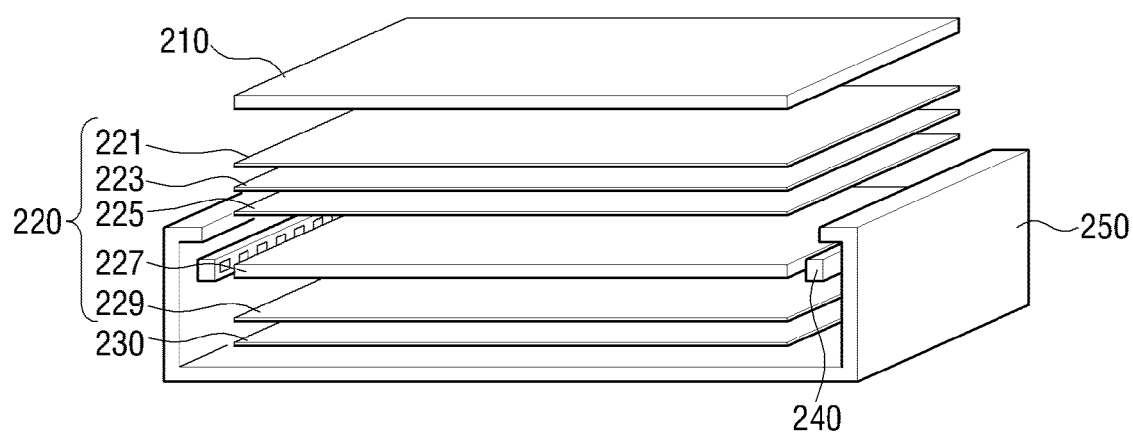
FIG. 3 is a diagram of the display module according to an exemplary embodiment.

FIG. 3 depicts the display module 140 according to an exemplary embodiment. The display module 140 includes a liquid crystal panel 210, a plurality of optical sheets 220, a heating sheet 230, a backlight unit 240, and a rear cover 250, as shown in FIG. 3.

The liquid crystal panel 210 visualizes and displays the image signal in a screen by regulating the light transmittance in the backlight unit 240.

The optical sheets 220 emit the light produced by the backlight unit 240 to the liquid crystal panel 210. The optical sheets 220 include a plurality of prism sheets 221 and 223, a diffuser sheet 225, a light guide plate 227, and a reflection sheet 229 as shown in FIG. 3.

The prism sheets 221 and 223 apply various optical effects to the backlight unit 240. For instance, the prism sheets 221 and 223, which include a high-brightness prism sheet, concentrate a polarization direction of the backlight in a specific direction.

The diffuser sheet 225 diffuses the backlight to ensure a wide viewing angel of the screen. The diffuser sheet 225 may concentrate the backlight to a relatively dark area. Thus, the diffuser sheet 225 serves to uniformly disperse the backlight. The diffuser sheet 225 may be implemented using a lenticular lens sheet which arranges a plurality of cylindrical lenses in row.

The light guide plate 227 forms a surface light source by diffusely reflecting an incident light from the side. The light guide plate 227 uniformly scatters the side light to emit the light of the uniform brightness to the liquid display panel 210. In more detail, the light guide plate 227 is printed or formed with a geometric pattern for diffusely reflecting the incident light in the bottom, so as to reflect the incident light with the uniform brightness.

The reflection sheet 229 reflects the light to direct the backlight to the liquid crystal panel 210.

As such, the optical sheet 220 regulates the direction of the light produced by the backlight unit 240, scatters and polarizes the light, and thus emits the backlight to the liquid crystal panel 210. The structure of the optical sheets 220 of FIG. 3 is merely exemplary. It is appreciated that various optical sheets of different types can be employed.

The heating sheet 230 transfers heat to the liquid crystal panel 210 to increase the temperature. The heating sheet 230 includes a heating wire for generating the heat. The heating sheet 230 produces the heat by supplying the power to the heating wire.

The heating sheet 230 is disposed between the liquid crystal panel 210 and the rear cover 250 (specifically, between the reflection sheet 229 and the rear cover 250) as shown in FIG. 3, by way of example. The heating sheet 230 can be disposed on the rear cover 250. The heating sheet 230 can also be united with the reflection sheet 229.

The heating sheet 230 is in the form of a sheet including the heating wire therein. As the heating sheet 230 is in the form of a sheet, the heating sheet 230 can be disposed to form one layer similar to the optical sheet 220. By virtue of the sheet type, the fabrication of the heating sheet 230 can be simplified.

Figure 6A:
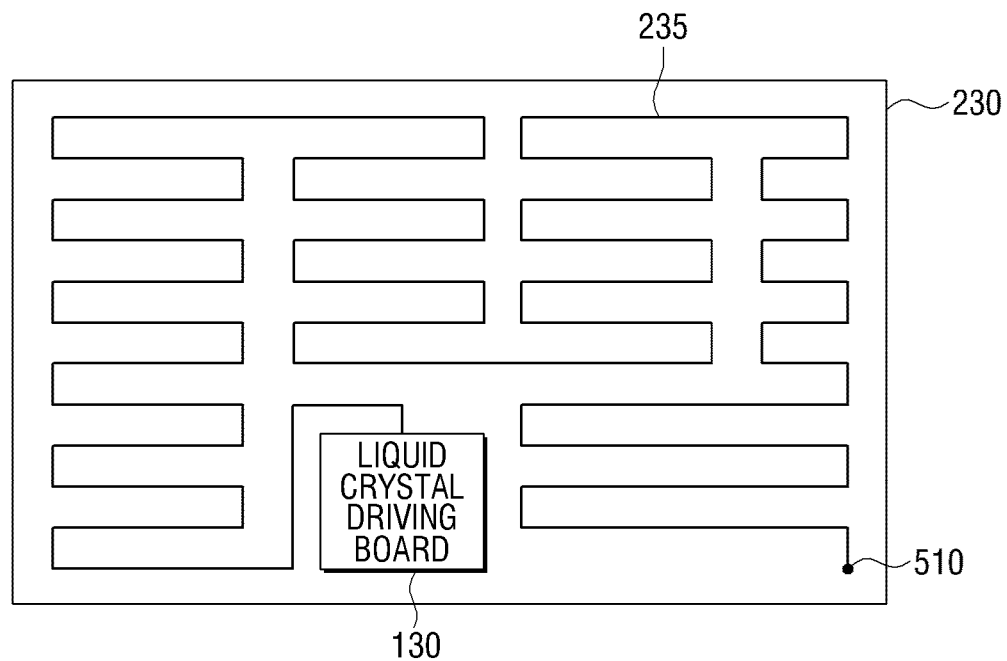
FIG. 6A is a diagram of the heating sheet when a liquid crystal driving board is mounted to the display module according to an exemplary embodiment.
Figure 6B:
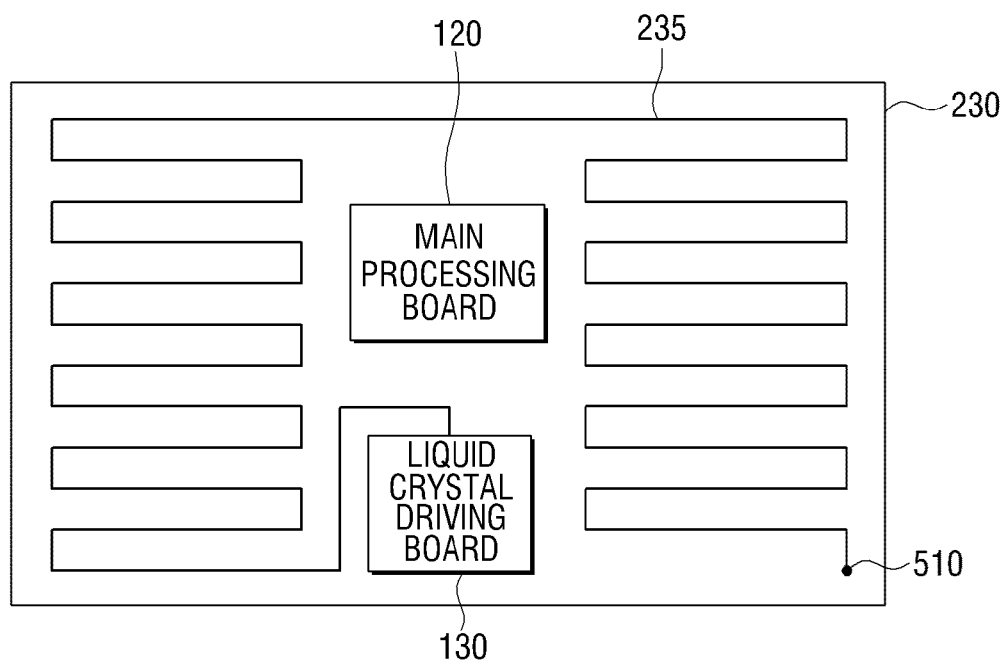
FIG. 6B is a diagram of the heating sheet when a main processing board and a liquid crystal driving board are mounted to the display module according to an exemplary embodiment.

Meanwhile, when the display apparatus 100 includes the main processing board 120 and the liquid crystal driving board 130 as shown in FIG. 1A, the heating sheet 230 is arranged to heat the region excluding the main processing board 120 and the liquid crystal driving board 130, which shall be described by referring to FIG. 6B.

When the display apparatus 100 includes the liquid crystal driving board 130 alone as shown in FIG. 1C, the heating sheet 230 is arranged to heat the region excluding the liquid crystal driving board 130, which shall be described by referring to FIG. 6A.

As such, the heating sheet 230 can be disposed to heat the other region excluding the heating elements in the liquid crystal panel 210. Thus, the display apparatus 100 can evenly arrange the temperature of the liquid crystal panel 210.

Figure 5A:
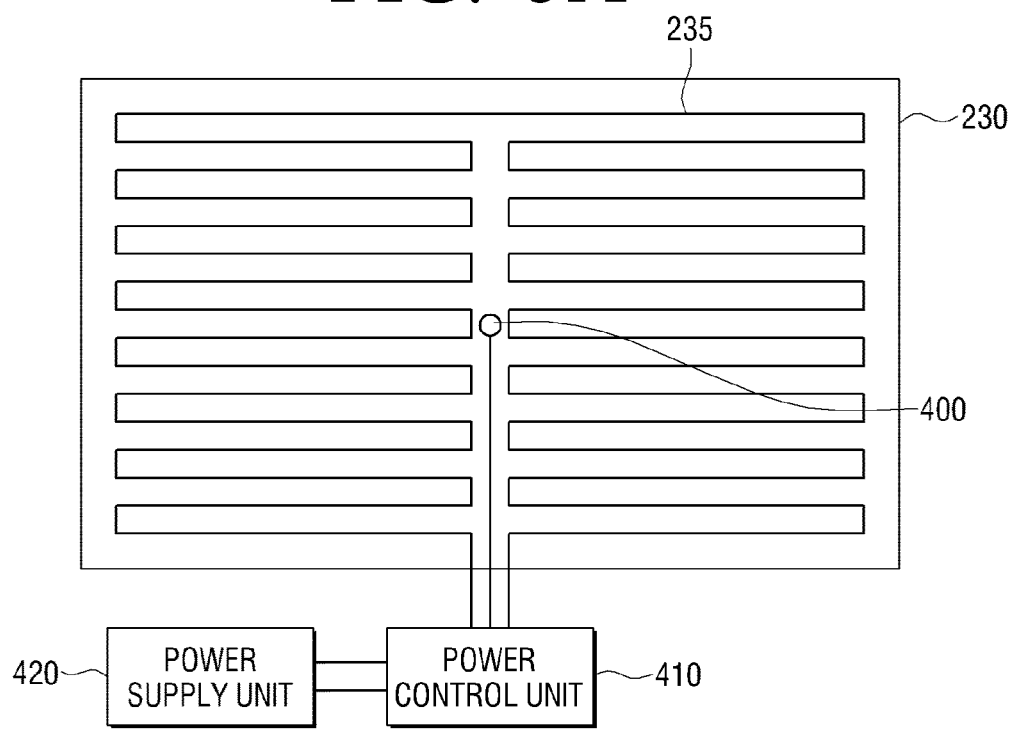
FIG. 5A is a diagram of the shape of the heating sheet including a temperature sensor unit according to another exemplary embodiment.

The heating sheet 230 may include a temperature sensor unit for detecting the temperature of the display module 140, and can adjust the heating level according to the temperature detected by the temperature sensor unit, which shall be further explained by referring to FIG. 5A.

The heating sheet 230 may be grounded by connecting one end of the heating wire to the power supply unit and the other end of the heating wire to the rear cover 250, which will be explained in detail by referring to FIGS. 6A and 7B.

In the heating sheet 230, one end of the heating wire may be connected to a power supply terminal of the power supply unit and the other end of the heating wire may be connected to a ground terminal of the power supply unit, which will be explained in detail by referring to FIGS. 4 and 7A.

As described above, the heating sheet 230 increases the temperature of the liquid crystal panel 210 by producing the heat.

The backlight unit 240 emits the light into the light guide plate 227 from the side of the light guide plate 227. As shown in FIG. 3, the backlight unit 240 is disposed on both sides of the light guide plate 227, and face each other. The light emitted by the backlight unit 240 from the sides of the light guide plate 227 is referred to as edge-type backlight. The light source of the edge-type backlight employs the point light source, more specifically, a LED light source. Yet, the backlight unit 240 does not limit the type of the light source.

The rear cover 250 accommodates the components of the display module 140. The shape or the size of the rear cover 250 is not limited, and any structure for accommodating the components of the display module 140 can be adopted.

Such a display module 140 is heated by the heating sheet 230 and thus its temperature rapidly increases. Thus, the display module 140 can reduce crosstalk between a left-eye image and a right-eye image of a 3D image.

Hereafter, various shapes of the heating sheet 230 are illustrated by referring to FIGS. 4 through 7B.

Figure 4:
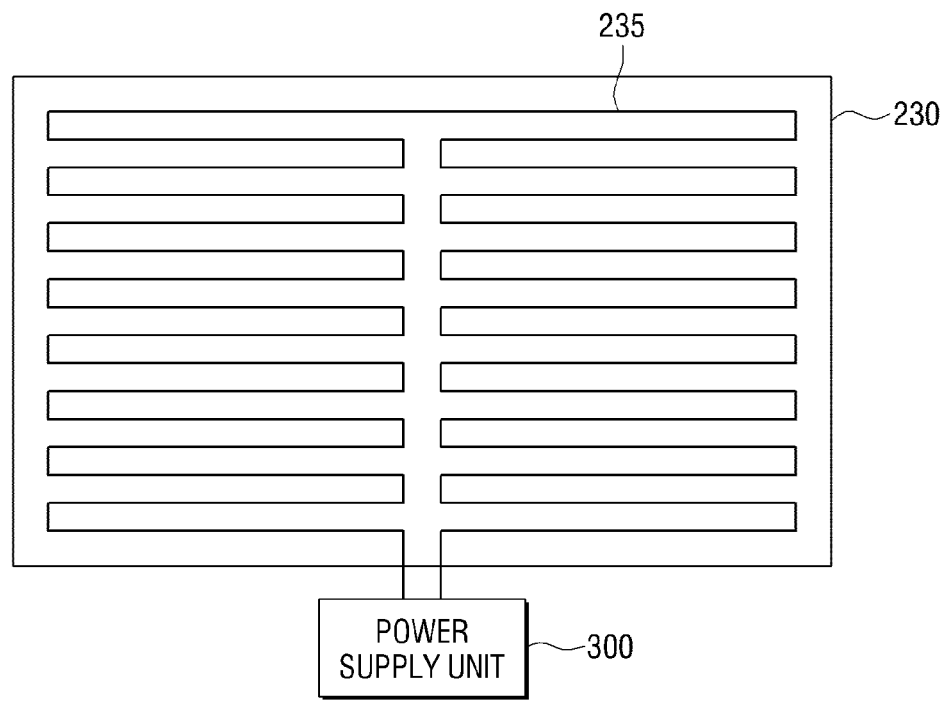
FIG. 4 is a diagram of a shape of a heating sheet according to an exemplary embodiment.

FIG. 4 depicts the shape of the heating sheet 230 according to an exemplary embodiment. The heating sheet 230 is in the form of the sheet and includes the heating wire 235 therein as shown in FIG. 4. The heating wire 235 is disposed all over the display module 140. Hence, the heating sheet 230 heats the whole display module 140.

The heating sheet 230 is connected to the power supply unit 300 which supplies power to the heating sheet 230. In more detail, one end of the heating wire 235 is connected to the power supply terminal (i.e., the (+) electrode) of the power supply unit 300 and the other end is connected to the ground terminal (i.e., the (−) electrode) of the power supply unit 300. Accordingly, the heating sheet 230 receives the power from the power supply unit 300 and produces the heat.

FIG. 5A depicts the shape of the heating sheet 230 including a temperature sensor unit 400 according to another exemplary embodiment. The temperature sensor unit 400 of FIG. 5A is disposed in the center of the screen to detect the temperature in the center of the screen. The temperature sensor unit 400 is disposed in the center of the screen by way of example. The temperature sensor unit 400 can be disposed in another region of the display module to detect the temperature. Also, the temperature sensor unit 400 can be disposed in a plurality of regions to detect the temperature.

The temperature sensor unit 400 sends the detected temperature information to a power control unit 410. The power control unit 410 adjusts the power supply of the power supply unit 420 according to the detected temperature information. For example, the power control unit 410 increases the power when the detected temperature falls below a specific temperature, and decreases the power when the detected temperature exceeds the specific temperature.

According to the temperature detected by the temperature sensor unit 400, the heating sheet 230 can regulate the heating level.

Figure 5B:
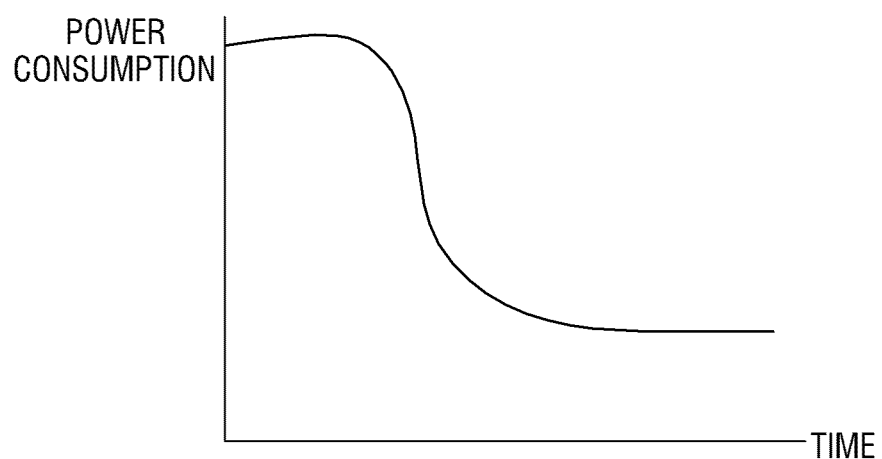
FIGS. 5B and 5C are graphs of power control supplied to the heating sheet according to another exemplary embodiment.

FIG. 5B is a graph of the heating level control by changing the amount of the supplied power. Since the power control unit 410 controls the power supply unit 420 to reduce the power consumption with time after the heating as shown in FIG. 5B, the heating sheet 230 maintains the temperature of the display module 140 at a particular temperature. Herein, the particular temperature can range from 30 degrees to 40 degrees Celsius. Approximately 33 degrees Celsius is optimal. As the temperature rises, the crosstalk of the display decreases, until the temperature reaches 33° C. As the temperature rises over 33° C., the occurrence of the crosstalk does not further decrease. That is, about 33° C. is the saturation temperature of the crosstalk. Accordingly, the power control unit 410 controls the temperature to keep the temperature of the display module 140 near 33° C. Here, the particular temperature is, but not limited to, 33° C. based on experiment by way of example. Naturally, the particular temperature can be any saturation temperature at which the crosstalk does not further reduce under the environmental condition of the display.

Figure 5C:
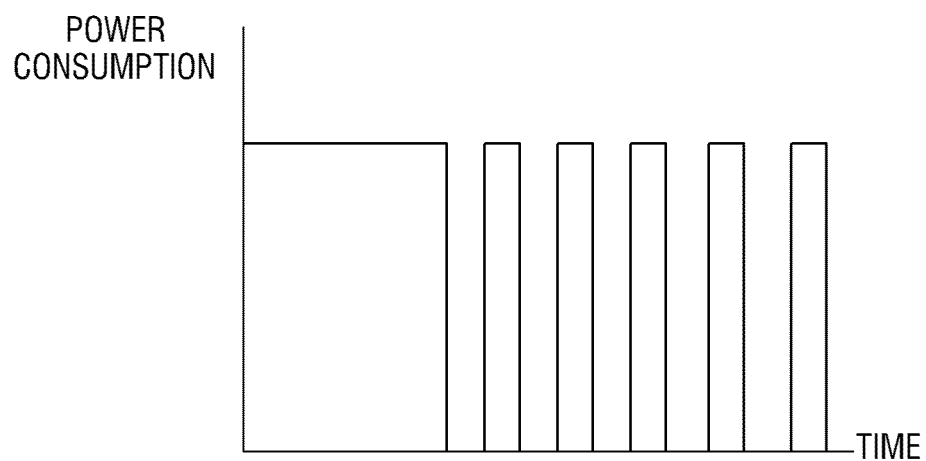

FIG. 5C is a graph illustrating controlling the heating level by changing a duty ratio of the supplied power. Since the power control unit 410 controls the power supply unit 420 to decrease the power duty ratio with time after the heating as shown in FIG. 5C, the heating sheet 230 maintains the temperature of the display module 140 at a particular temperature.

Meanwhile, the rear cover 250 includes at least one of the liquid crystal driving board, the power supply board, and the main processing board, which are secured to the rear cover 250. The heating sheet 230 is disposed to heat the region excluding at least one of the liquid crystal driving board, the power supply board, and the main processing board, which shall be described with reference to FIGS. 6A, 6B and 6C.

FIG. 6A depicts the shape of the heating sheet 230 when the liquid crystal driving board 130 is mounted to the rear cover 250 of the display module 140 according to an exemplary embodiment. In FIG. 6A, the liquid crystal driving board 130 is mounted to the rear cover 250 of the display module 140, and the heating sheet 230 and the liquid crystal driving board 130 are superimposed.

When the liquid crystal driving board 130 is mounted to the display module 140, the heating wire 235 is not disposed in the region of the liquid crystal driving board 130 as shown in FIG. 6A. Since the liquid crystal driving board 130 generates the heat by itself, there is no need to arrange the separate heating wire 235.

In FIG. 6A, while one end of the heating wire 235 is connected to the power supply unit (not shown) via the liquid crystal driving board 130, the other end 510 of the heating wire 235 is grounded by the rear cover 250.

FIG. 6B depicts the shape of the heating sheet 230 when the liquid crystal driving board 130 and the main processing board 120 are mounted to the rear cover 250 of the display module 140 according to an exemplary embodiment. In FIG. 6B, the liquid crystal driving board 130 and the main processing board 120 are mounted to the rear cover 250 of the display module 140, and the heating sheet 230, the liquid crystal driving board 130, and the main processing board 120 are superimposed.

When the liquid crystal driving board 130 and the main processing board 120 are mounted to the display module 140, the heating wire 235 is not disposed in the regions of the liquid crystal driving board 130 and the main processing board 120 as shown in FIG. 6B. Since the liquid crystal driving board 130 and the main processing board 120 produce the heat by themselves, there is no need to arrange the separate heating wire 235.

Figure 6C:
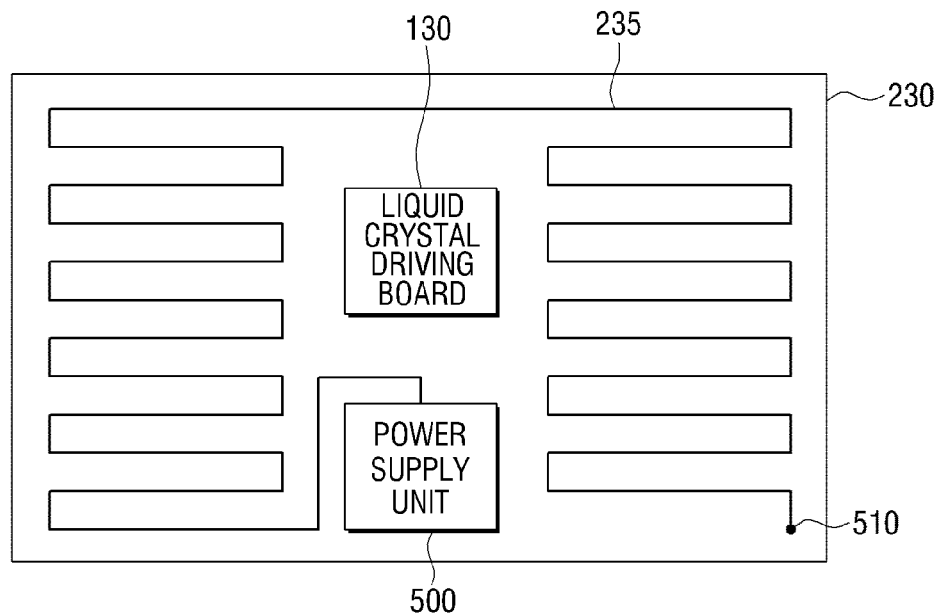
FIG. 6C is a diagram of the heating sheet when a liquid crystal driving board and a power supply unit are mounted to the display module according to an exemplary embodiment.

FIG. 6C depicts the shape of the heating sheet when the liquid crystal driving board 130 and the power supply unit 500 are mounted to the rear cover 250 of the display module 140 according to an exemplary embodiment. In FIG. 6C, the liquid crystal driving board 130 and the power supply unit 500 are mounted to the rear cover 250 of the display module 140, and the heating sheet 230, the liquid crystal driving board 130, and the power supply unit 500 are superimposed.

When the liquid crystal driving board 130 and the power supply unit 500 are mounted to the display module 140, the heating wire 235 is not disposed in the regions of the liquid crystal driving board 130 and the power supply unit 500 as shown in FIG. 6C. Since the liquid crystal driving board 130 and the power supply unit 500 generate the heat by themselves, there is no need to arrange the separate heating wire 235.

While only the liquid crystal driving board 130, the main processing board 120, and the power supply unit 500 are illustrated in FIGS. 6A, 6B and 6C, other components for generating heat can be employed. That is, the heating wire 235 of the heating sheet 230 is disposed in the part not including the component producing the heat by itself. Thus, the display module 140 can enhance the uniformity of the temperature all over the screen.

Figure 7A:
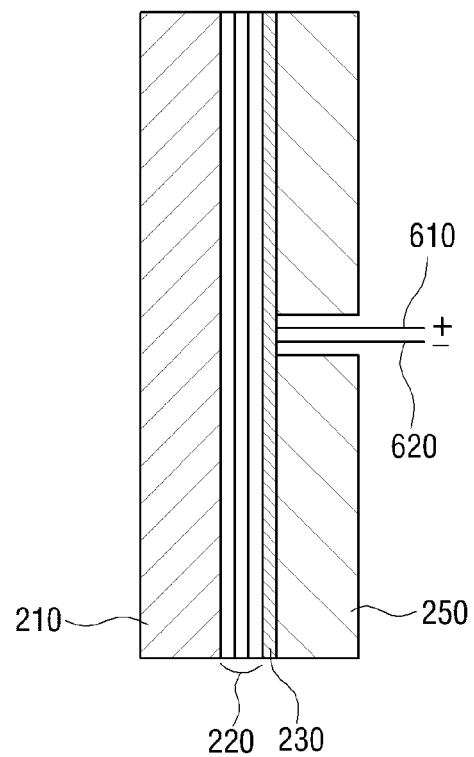
FIG. 7A is a diagram of two connection lines of the heating sheet when the heating sheet is grounded by a power supply unit according to an exemplary embodiment.

FIG. 7A depicts two connectors of the heating sheet 230 when the heating sheet 230 is grounded by the power supply unit 300 according to an exemplary embodiment, which is explained together with FIG. 4.

In the heating sheet 230, two connectors 610 and 620 connected to the heating wire 235 are linked to the power supply unit 300 as shown in FIG. 7A. That is, the (+) connector 610 is connected to the power supply terminal of the power supply unit 300, and the (−) connector 620 is connected to the ground terminal of the power supply unit 300.

As such, the heating sheet 230 can be connected to the power supply unit 300 through the two connectors.

Figure 7B:
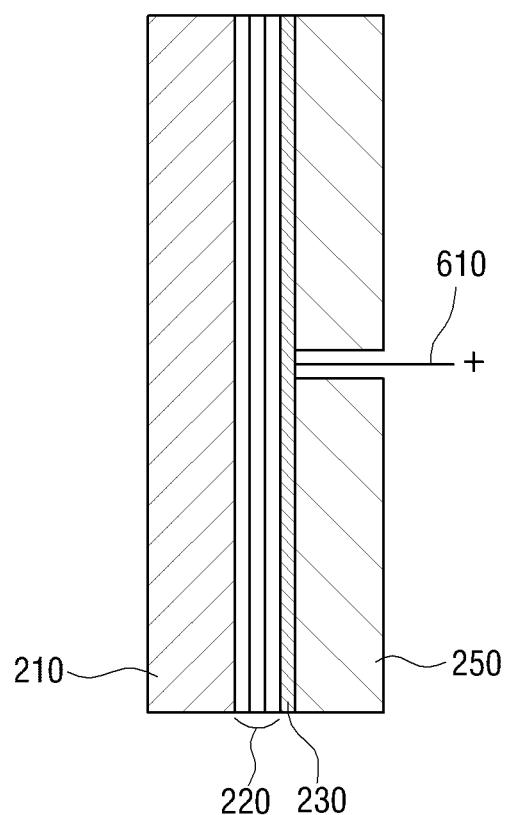
FIG. 7B is a diagram of one connection line of the heating sheet when the heating sheet is grounded by a rear cover according to an exemplary embodiment.

FIG. 7B depicts one connector 610 of the heating sheet 230 when the heating sheet 230 is earthed by the rear cover 250 according to an exemplary embodiment of the invention, which is explained together with FIG. 6A.

As shown in FIG. 7B, the single connector 610 connected to the heating wire 235 in the heating sheet 230 is connected to the power supply unit (not shown) via the liquid crystal driving board 130. The other end 510 of the heating wire 235 is grounded by the rear cover 250.

Since the single connector 610 comes from the heating sheet 230 through the rear cover 250 as shown in FIG. 7B, the circuit structure of the display apparatus 100 can be further simplified.

While the other end of the heating wire 235 is connected to and grounded by the rear cover 250 in this exemplary embodiment, the other end of the heating wire 235 can be connected to any part which can be grounded in the display module 140.

So far, the various shapes of the heating sheet 230 have been illustrated. By virtue of the heating sheet 230, the display module 140 can rapidly attain the saturation temperature for the crosstalk reduction.

Figure 8A:
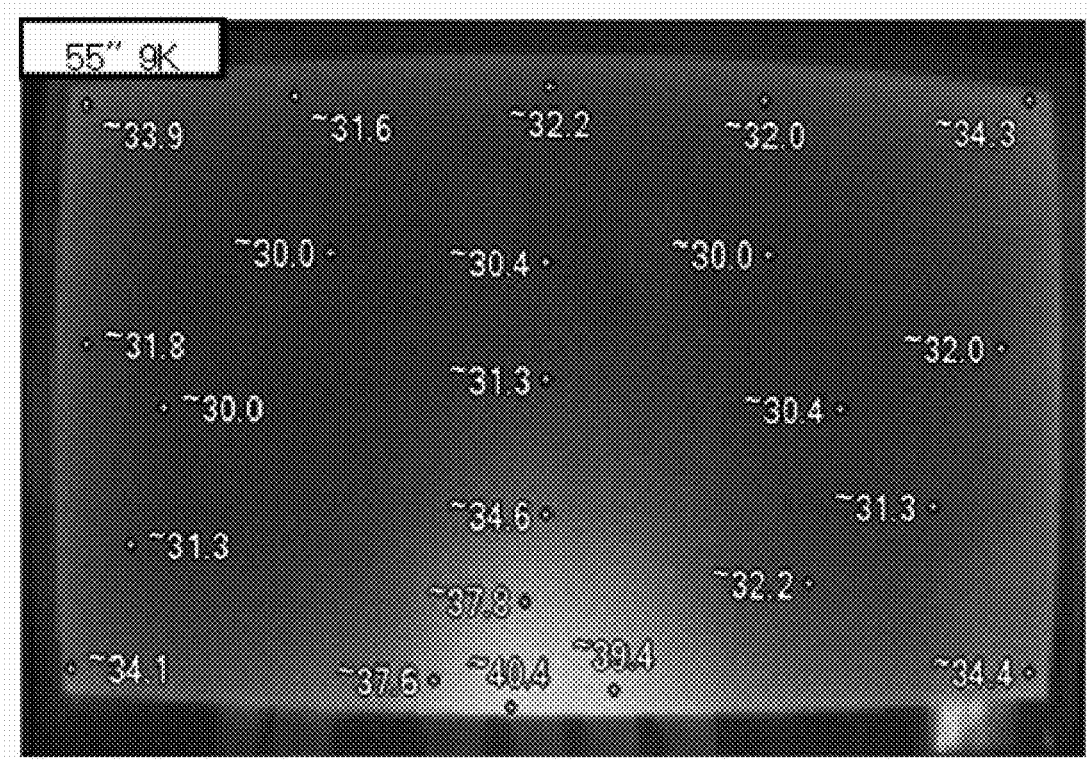
FIG. 8A is a diagram of screen temperature distribution of the display apparatus without the heating sheet.

Measurements of the temperature distribution of the display screen of the edge-type 3D TV before and after the arrangement of the heating sheet 230 will be explained with reference to FIGS. 8A and 8B. FIG. 8A depicts the screen temperature distribution of the display apparatus without the heating sheet 230. When the heating sheet 230 is not equipped, the temperature in the center of the screen is approximately 30° C. to 31° C. as shown in FIG. 8A.

Figure 8B:
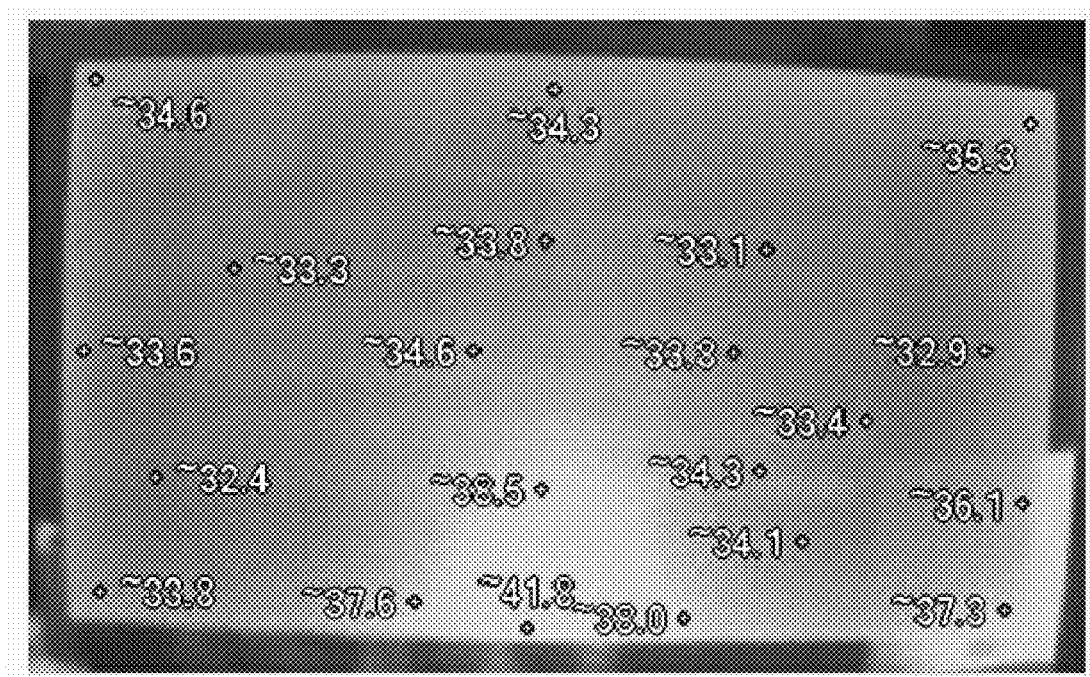
FIG. 8B is a diagram of screen temperature distribution of the display apparatus with the heating sheet.

FIG. 8B depicts the screen temperature distribution of the display apparatus with the heating sheet 230. When the heating sheet 230 is equipped, the temperature in the center of the screen rises to approximately 33° C.~34° C. as shown in FIG. 8B.

As above, since the heating sheet 230 is disposed in the display module 140 to raise the temperature of the display module 140, the occurrence of the crosstalk can be reduced.

In this exemplary embodiment, the heating sheet can be implemented using, but not limited to, the sheet including the heating wire. Hereafter, the heating sheet of a surface heating element type formed of one of graphite, nichrome wire, and metal thin film is explained by referring to FIGS. 9, 10, and 11.

Figure 9:
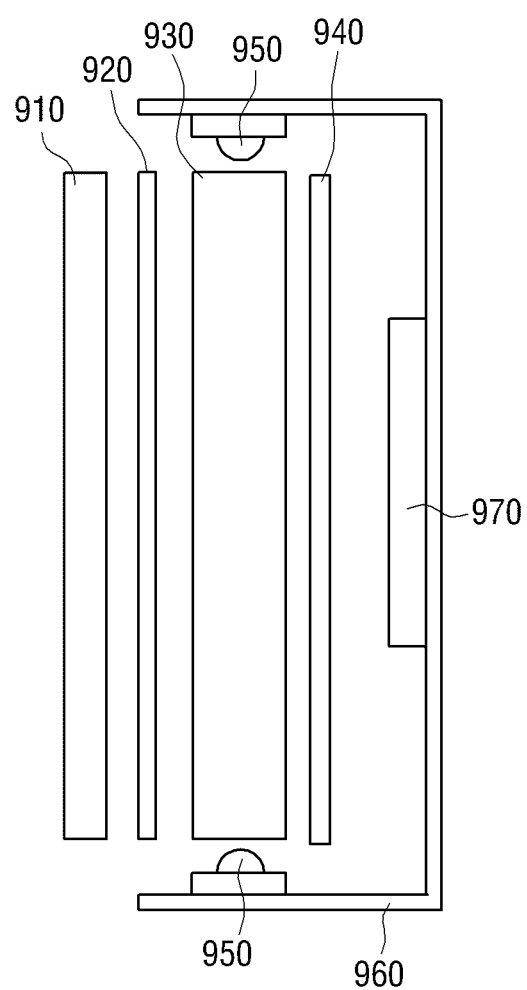
FIG. 9 is a sectional view of the display module including the heating sheet according to another exemplary embodiment.

FIG. 9 is a sectional view of the display module 140 including the heating sheet 970 of the surface heating element type according to an exemplary embodiment. The display module 140 includes a liquid crystal panel 910, a diffuser sheet 920, a light guide plate 930, a reflection plate 940, a backlight unit 950, a rear cover 960, and a heating sheet 970 as shown in FIG. 9.

The rear cover 960 accommodates the liquid crystal panel 910, the diffuser sheet 920, the light guide plate 930, the reflection plate 940, the backlight unit 950, and the heating sheet 970.

The liquid crystal panel 910, the diffuser sheet 920, the light guide plate 930, and the reflection plate 940 are arranged in order in the rear cover 960. The liquid crystal panel 910, the diffuser sheet 920, the light guide plate 930, and the reflection plate 940 have been explained in FIG. 3.

The backlight unit 950 provides light to the liquid crystal panel 910 by emitting the light to the light guide plate 930. The backlight unit 950 is of the edge type which is disposed in the side of the liquid crystal panel 910 for providing the backlight.

The heating sheet 970 is attached to the rear cover 960 and provides heat to the liquid crystal panel 910. More specifically, the heating sheet 970 is attached to the center part of one side of the rear cover 970 and provides the heat to the center part of the liquid crystal panel 910. Since the backlight unit 950 is positioned in the side of the liquid crystal panel 910, the temperature of the side of the liquid crystal panel 910 is higher than that of the center part. Hence, by placing the heating sheet 960 in the center part of the rear cover 960 and providing the heat to the center part of the liquid crystal panel 910, the temperature difference between the regions of the liquid crystal panel 910 is reduced.

Herein, the heating sheet 970 is the surface-type heat source which produces the heat by applying currents. The heating sheet 970 can be rectangular similar to the rear cover 960 as shown in FIG. 10. The size of the heating sheet 970 can be, for example, 400 mm in length and 200 mm in width. The heating sheet 970 can be formed of one of the graphite, the nichrome wire, and the metal thin film. While the shape, size, and material of the surface heating element 970 are just exemplary, the surface heating element 970 can be implemented in different shapes and sizes with different materials.

A power supply board (not shown) for supplying the power to the display module 140 is equipped outside the display module 140 which accommodates the display components including the liquid crystal panel 910, the optical sheets 920, 930 and 940, and the backlight unit 950. For example, the power supply board can be disposed in a supporting apparatus 170 outside the display module 140 as shown in FIG. 11. The power supply board can be disposed in the external main control apparatus 150 outside the display module 140 as shown in FIG. 1D.

As stated above, by providing the heat to the center part of the liquid crystal panel 910 using the heating sheet 970, the uniform temperature can be attained across the liquid crystal panel 910. Thus, the warpage or the distortion caused by the temperature difference of the liquid crystal panel 910 can be avoided.

While the heating sheet 970 of the surface heating element type is disposed in the center part of the rear cover 960 in this exemplary embodiment, the heating sheet 970 can be disposed in other regions of the relatively low temperature. For example, the heating sheet 970 of the surface heating element type can be disposed away from the heating element such as power supply board, main processing board, and liquid crystal driving board.

Hereafter, the temperature compensation unit 144 which is the heat conductive sheet is described by referring to FIGS. 12 and 13.

FIG. 12 depicts the display apparatus 100 including a heat conductive sheet 1250 according to an exemplary embodiment. The display apparatus 100 of FIG. 12 includes an external casing 1210, a power supply board 1220, a speaker 1230, a display module 1240, and a conductive sheet 1250.

The external casing 1210 accommodates and protects the display module 140 and the components of the display apparatus 100.

The power supply board 1220 is disposed in the external casing 1210 and supplies the power to drive the components of the display module 140.

The speaker 1230 is disposed in the external casing 1210 and outputs an audio signal processed by an audio signal processor (not shown).

The display module 1240 outputs the light emitted from the backlight unit, and includes a liquid crystal panel, a plurality of optical sheets, a backlight unit, and a rear cover. The backlight unit of the display module 140 is of the edge type which is disposed in the side of the liquid crystal panel to provide the backlight.

The power supply board 1220 supplies the power to the display module 1240 and generates heat. Accordingly, the temperature of the liquid crystal panel around the power supply board 1220 increases, the temperature in the particular region of the liquid crystal panel also increases, and thus the liquid crystal panel is subject to warpage or image distortion.

To address this problem, the heat conductive sheet 1250 is interposed between the power supply board 1220 and the display module 1240 and evenly conducts the heat generated from the power supply board 1220 over the liquid crystal panel.

In further detail, the heat conductive sheet 1250, which is attached to one side of the rear cover as shown in FIG. 12, evenly conducts the heat generated from the power supply board 1220 all over the display module 1240. In so doing, the heat conductive sheet 1250 can be a graphite sheet formed of graphite which is a high heat conductive material.

The heat conductive sheet 1250 can be attached to the center part of one side of the display module 1240, more specifically, of the rear cover. When the backlight unit is an edge type backlight unit, there is no need to conduct the heat in the edges of the sash thanks to the heat generated by the backlight unit.

FIG. 13 depicts another display apparatus 100 including the heat conductive sheet 1250 according to an exemplary embodiment. The display apparatus 100 of FIG. 13 further includes an insulating material 1260 and a heat conductor 1270 in addition to the components of the display apparatus 100 of FIG. 12.

The external casing 1210, the power supply board 1220, the speaker 1230, the display panel 1240, and the heat conductive sheet 1250 of the display apparatus 100 of FIG. 13 have been described by referring to FIG. 12.

The insulating material 1260 is disposed on the conductive sheet 1250. The insulating material 1260, which is interposed between the part which generates much heat in the power supply board 1220, and the heat conductive sheet 1250, blocks the heat transfer from the power supply board 1220. The insulating material 1260 can completely block the heat generated from the power supply board 1220 and minimize the heat transfer.

This is because the power supply board 1220 generates the same heat in the particular region, rather than generating the same heat all over the display apparatus 100. Hence, the insulating material 1260, which is interposed between the part which generates much heat in the power supply board 1220, and the heat conductive sheet 1250, minimizes the heat transferred from the power supply board 1220 to the display module 1240.

The heat conductor 1270 is disposed in one side of the insulating material 1260 as shown in FIG. 13. More specifically, the heat conductor 1270 is interposed between the region excluding the insulating material 1260 in the power supply board 1220, and the heat conductive sheet 1250, and transfers the heat generated from the power supply board 1220 to the heat conductive sheet 1250. At this time, the heat conductive 1270 can be formed of a silicon-based material.

In the exemplary embodiments, the warpage or the distortion of the liquid crystal panel can be prevented by removing the temperature imbalance caused by the heat generated from the power supply board 1220.

While the heat generated from the power supply board is conducted across the display module 1240 by way of example, the heat generated from the other heating element can be conducted all over the display module 1240. For example, between the heating element such as liquid crystal driving board and main processing board and the liquid crystal panel, the heat generated from the heating element can be conducted across the display module 1240.

Figure 14:
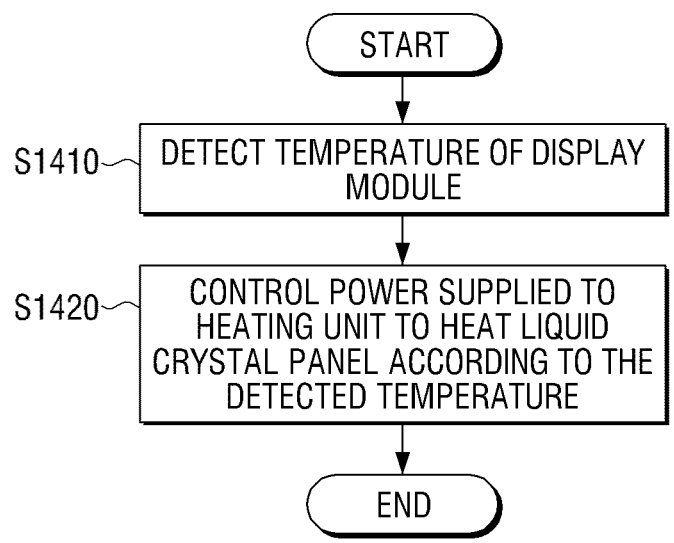
FIG. 14 is a flowchart of a method for controlling the temperature of the display module according to an exemplary embodiment.

Now, a method for controlling the temperature of the display module 140 of the display apparatus 100 including the display module 140 including the heating sheet is explained by referring to FIG. 14.

The display apparatus 100 detects the temperature of the display module 140 (S1410). The display apparatus 100 can detect the temperature of the display module 140 using at least one temperature sensor 400 disposed in at least one specific region of the display module 140.

According to the detected temperature, the display apparatus 100 controls the power supplied to the heating unit 230 so as to heat the liquid crystal panel 210 (S1420). In more detail, when the temperature detected in the specific region is lower than a certain temperature, the display module 140 generates heat by increasing the power. When the temperature detected in the other particular region is greater than a first temperature, the display module 140 can reduce the amount of heat generated by decreasing the power. That is, the display apparatus 100 can equalize the temperature of the display module 140 by partially controlling the power of the plurality of the regions according to the detected temperature. The heating unit can be implemented using the heating sheet 230 as explained earlier.

After the heating, the display apparatus 100 can control the power supplied to the heating unit 230 by gradually decreasing the power with time so that the temperature of the display module 140 is maintained in the specific temperature range. Herein, the specific temperature ranges are preferably from 30 degrees to 40 degrees. And 33° C. is most preferred. This is because the occurrence of the crosstalk is not lowered further even when the temperature rises above 33° C. Yet, the specific temperature is, but not limited to, 33° C. based on an experimental result.

Alternatively, after the heating, the display apparatus 100 can maintain the temperature of the display module 140 to the specific temperature by decreasing the duty ratio of the power with time.

As set forth above, the display module 140 is heated to maintain the adequate temperature. Therefore, it is possible to reduce the occurrence of the crosstalk of the display module 140 and to prevent warpage or image distortion due to the temperature difference.

The display apparatus can employ any display apparatus including the edge-type backlight. For example, the display apparatus is applicable to a 3D TV, a general display TV, a display monitor, a notebook computer, and so on.

The foregoing exemplary embodiments are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A display module comprising:
a liquid crystal panel that displays an input image;
a backlight unit that produces light;
at least one optical sheet that emits the light produced by the backlight unit toward a rear side of the liquid crystal panel; and
a temperature compensation unit that adjusts a temperature of the liquid crystal panel,
wherein the temperature compensation unit comprises a heating sheet that transfers heat to a region of the liquid crystal panel, the heating sheet including a heating wire disposed in a first region of the heating sheet and excluding a second region of the heating sheet superimposed over at least one of a liquid crystal driving board, a processing board, and a power supply unit.

2. The display module of claim 1, further comprising:
a rear cover that accommodates the liquid crystal panel, the at least one optical sheet, and the backlight unit.

3. The display module of claim 2, wherein the heating sheet receives an electrical signal, produces heat, and transfers the heat to the liquid crystal panel;
wherein the heating sheet is disposed in a region between the liquid crystal panel and the rear cover.

4. The display module of claim 3, wherein the at least one optical sheet comprises:
a light guide plate,
wherein the backlight unit comprises a plurality of Light Emitting Diodes (LEDs) disposed at least one side of the light guide plate.

5. The display module of claim 3, wherein the heating sheet is disposed in a center part of the rear cover.

6. The display module of claim 4, wherein the at least one optical sheet further comprises:
a reflection sheet disposed between the heating sheet and the light guide plate, and which reflects light produced by the backlight unit toward the liquid crystal panel;
a diffuser sheet disposed between the light guide plate and the liquid crystal panel, and which uniformly disperses the light produced by the backlight unit toward the liquid crystal panel; and
at least one prism sheet disposed between the diffuser sheet and the liquid crystal panel, and which concentrates a polarization direction of the light produced by the backlight unit in a specific direction.

7. The display module of claim 6, wherein the heating sheet is disposed between the rear cover and the reflecting sheet.

8. The display module of claim 1, wherein the heating sheet is provided directly between a reflection sheet of the at least one optical sheet and a rear cover of the display module.

9. A display apparatus comprising:
a display module which comprises:
a front cover,
a liquid crystal panel that displays an input image,
a backlight unit disposed behind the liquid crystal panel, and which produces light,
at least one optical sheet that emits the light produced from the backlight unit toward a rear side of the liquid crystal panel,
a rear cover coupled to the front cover, and which accommodates the liquid crystal panel, the at least one optical sheet, and the backlight unit, and
a temperature compensation unit disposed behind the liquid crystal panel, and which reduces a difference in temperature distribution of the liquid crystal panel;
a liquid crystal driving board that drives the liquid crystal panel;
a main processing board that converts and processes the input image to display the input image on the liquid crystal panel; and
a power supply unit that supplies power to electrical elements comprising the liquid crystal panel, the backlight unit, the liquid crystal driving board, and the main processing board,
wherein the temperature compensation unit comprises a heating sheet that transfers heat to a region of the liquid crystal panel, the heating sheet including a heating wire disposed in a region excluding at least one of the liquid crystal driving board, the main processing board, and the power supply unit.

10. The display apparatus of claim 9, wherein the heating sheet receives an electric signal from the power supply unit, produces heat, and transfers the heat to the liquid crystal panel.

11. The display apparatus of claim 10, wherein the heating sheet is disposed in a center part of the rear cover.

12. The display apparatus of claim 10, wherein at least one of the liquid crystal driving board, the main processing board, and the power supply unit is disposed on a rear side of the rear cover.

13. The display apparatus of claim 10, further comprising:
a main control apparatus that is physically separate from the rear cover,
wherein the main control apparatus accommodates at least one of the liquid crystal driving board, the main processing board, and the power supply unit.

14. The display apparatus of claim 10, further comprising:
a temperature sensor unit that detects the temperature of the display module;
a power supply unit that supplies power to the heating sheet; and
a power control unit that regulates the power of the power supply unit according to the temperature information detected by the temperature sensor unit.

15. The display apparatus of claim 14, wherein at least one temperature sensor unit is disposed at a center part inside the rear cover.

16. The display apparatus of claim 10, further comprising:
a power supply unit that supplies power to the heating sheet,
wherein the heating sheet comprises:
a connector that connects the heating sheet to the power supply unit.

17. The display apparatus of claim 16, wherein a first end of the connector is connected to a power supply terminal of the power supply unit, and
a second end of the connector is connected to and grounded by the rear cover.

18. The display apparatus of claim 16, wherein a first end of the connector is connected to a power supply terminal of the power supply unit, and
a second end of the connector is connected to and grounded by a ground terminal of the power supply unit.

* * * * *